Feb. 26, 1963   J. W. TAP   3,079,525
DIRECT-VOLTAGE CONVERTER
Filed April 6, 1959   2 Sheets-Sheet 1

INVENTOR
JAN WILLEM TAP
BY
Frank R. Trifari
AGENT

Feb. 26, 1963

J. W. TAP 3,079,525

DIRECT-VOLTAGE CONVERTER

Filed April 6, 1959

2 Sheets-Sheet 2

INVENTOR
JAN WILLEM TAP

BY
AGENT

3,079,525
DIRECT-VOLTAGE CONVERTER

Jan Willem Tap, Eindhoven, Netherlands, assignor to North American Philips Company, Inc., New York, N.Y., a corporation of Delaware
Filed Apr. 6, 1959, Ser. No. 804,243
Claims priority, application Germany Apr. 30, 1958
8 Claims. (Cl. 321—2)

This invention relates to a direct-voltage converter comprising a transistor oscillator with transformer feedback and including a rectifier for producing an increased direct voltage across a pair of output terminals by rectification of the oscillator oscillations.

Known converters of this type have a limitation in that the rectified voltage is greatly increased when the load is switched out of circuit. Hence the operating direct voltage output is considerably limited by the condition that under no-load conditions the collector voltage and the output voltage must never exceed the maximum permissible values for the transistors, rectifiers and any smoothing capacitors employed.

The present invention provides a circuit arrangement in which the no-load voltages which might injure various circuit components are avoided in a very simple manner, while furthermore the power consumed in no-load operation is materially reduced.

The direct-voltage converter in accordance with the invention is characterized in that the emitter-base circuit of each transistor of the oscillator is connected in the pass direction in the direct-current output circuit of the converter and is shunted by a rectifier, for example a point-contact diode, which is likewise connected in the pass direction with respect to said direct current output circuit. Thus, under no-load conditions no forward base current can flow in the said emitter-base circuit: this base current increases with the load and can at most be equal to the output direct current.

Preferably the output direct current circuit of the converter also contains the direct-voltage supply source. Thus, via the load, the base of each oscillator transistor is biased in the pass direction by the threshold voltage of the shunting rectifier, this bias voltage promoting the starting of the oscillator.

Figure 1:
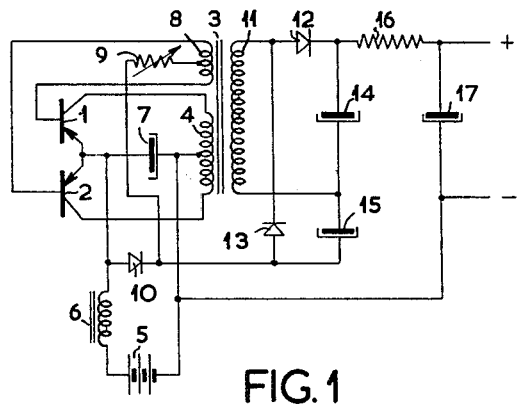
Figure 2:
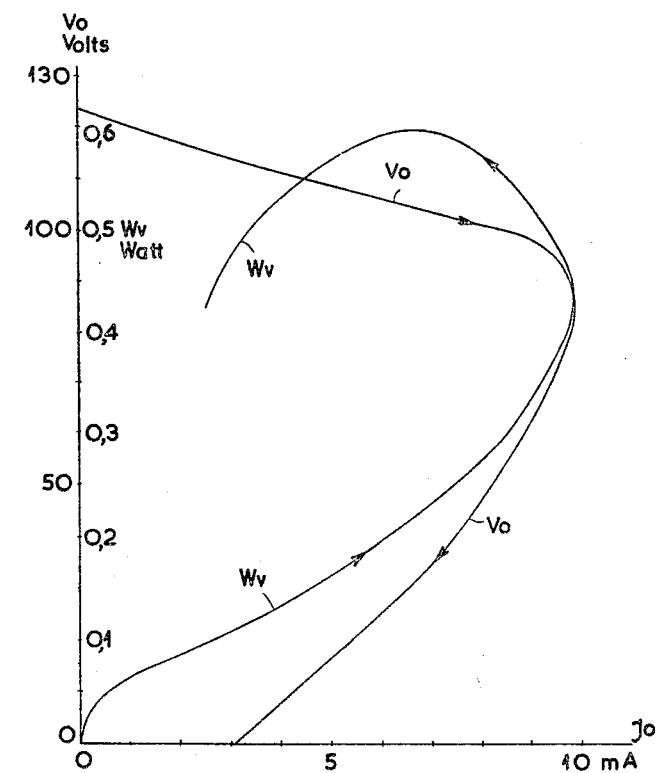
Figure 3:
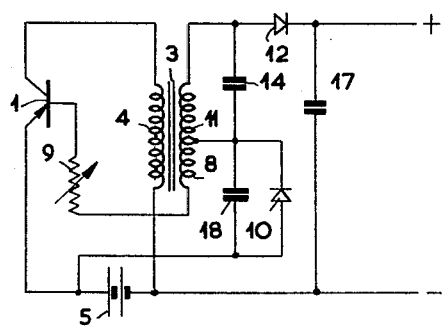
Figure 4:
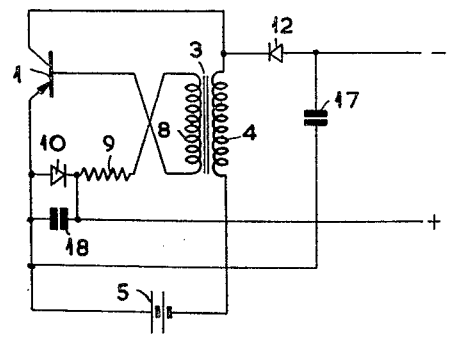

In order that the invention may readily be carried out, three embodiments thereof will now be described, by way of example, with reference to the accompanying diagrammatic drawings, in which:

FIG. 1 is a circuit diagram of a first embodiment;
FIG. 2 shows the load curves of the embodiment of FIG. 1;
FIG. 3 is a circuit diagram of a second embodiment, and
FIG. 4 is a circuit diagram of a third embodiment.

The embodiment shown in FIG. 1 contains two push-pull-connected transistors 1 and 2 which are fed back via a transformer 3, so that their respective main circuits are alternately conductive and non-conductive. The transformer 3 has a primary winding 4 the ends of which are connected to the collector electrodes of the transistors 1 and 2. This winding is provided with a centre tap which is directly connected to the negative terminal of a direct-voltage supply source 5. The positive terminal of the supply source 5 is connected to the emitters of the transistors 1 and 2 via an anti-interference choke 6, while an electrolytic capacitor 7 is connected between these emitters and the centre tap. A feedback winding 8 of the transformer 3 is connected between the bases of the transistors 1 and 2. This feedback winding also has a centre tap which is connected to the emitters of the transistors 1 and 2 via a variable resistor 9 and a diode 10 connected in the blocking direction for the base current. A secondary winding 11 of the transformer 3 is connected to two series-connected electrolytic capacitors 14 and 15 via a rectifier comprising two diodes 12 and 13 in voltage doubler connection. The negative electrode of the capacitor 15 and the anode of the diode 13 are connected to the junction point of the resistor 9 and the diode 10, while the positive electrode of the capacitor 14 and the cathode of the diode 12 are connected to the positive output terminal of the converter via a smoothing resistor 16. The negative output terminal of the converter is directly connected to the negative terminal of the supply source 5 so that the voltage of this source contributes to the increase of the output voltage of the converter. Finally a smoothing capacitor 17 is connected between the output terminals of the converter.

In known push-pull converter arrangements, for example in the converter arrangement described in U.S. Patent 2,951,994, the output circuit or load circuit is generally completely separated with respect to direct current both from the input circuit and the voltage supply by means of a transformer such as the transformer 3. In U.S. Patent 2,881,380 it was proposed to feed back the substantially unsmoothed current, which is supplied to the load via the rectifier, to the base of the transistor when it is in the conductive condition, so that this current renders the emitter-base layer conductive. In the embodiment described, the output direct current circuit similarly includes the base-emitter circuits of both transistors 1 and 2 and also the choke 6 and the supply source 5. The mean base-emitter current of both transistors is consequently at most equal to the load current, for this load current can also flow through the diode 10 shunting the base-emitter circuits of the transistors 1 and 2 and connected in the reverse direction for the base currents of these transistors and in the pass direction for the load current. The base currents of the transistors 1 and 2 depend principally upon the feedback through the windings 4 and 8 of the transformer 3. They are furthermore limited by the adjustable resistor 9 connected in series in each base circuit. However, this base current must traverse the diodes 13 and 12, the smoothing resistor 16 and the load connected to the output terminals of the converter, so that its mean value can on no account exceed the load current. In contradistinction thereto, the load current can also traverse the shunting diode 10 via the smoothing resistor 16 and the diodes 12 and 13, so that it can exceed the mean base current of the transistors 1 and 2. This results in the following favourable loading properties:

Firstly, a certain, be it small, voltage drop is produced across the diode 10, so that the means base current and hence also the mean collector current of the transistors 1 and 2 tend slightly to increase with increasing load, and hence the voltage decrease across the windings 4 and 8 produced by increase of the load is at least partially compensated, so that the converter has a comparatively small internal resistance.

Secondly, when the load is switched off, current can no longer flow to the bases of the transistors 1 and 2, so that the oscillator comprising the transistors 1 and 2 ceases oscillating. This is a very favourable property. In all known converters the output voltage is comparatively greatly increased when the load is completely switched off. This increased output voltage may damage various circuit components: firstly the rectifier diodes 12 and 13 but also the transistors 1 and 2 and the capacitors 14, 15 and 17. With increase in the output voltage the alternating voltage across the windings 4, 8 and 11 also increases, so that the breakdown voltage of the collectors of the transistors 1 and 2 and the breakdown voltage of the diodes 13 and 12 may be exceeded under certain circumstances. When the load is switched off and assuming that the leakage currents of the electrolytic capacitor 17 and the capacitors 14 and 15 are very small, a slight leakage current traverses the diodes 12 and 13 in the blocking direction.

The base-emitter paths of both transistors 1 and 2 and the diode 10 are polarized in the blocking direction by this leakage current, so that the said leakage current promotes the blocking of the oscillator comprising the transistors 1 and 2 by interrupting the forward base current. Owing to this leakage current the capacitors 14, 15 and 17 are gradually discharged and at the instant at which the leakage current through the diodes 12 and 13 is no longer sufficient to keep the diode 10 cut off, the oscillator restarts oscillating and is cut off again when the capacitors 14, 15 and 17 have been charged and the voltage produced across each half of the winding 8 becomes smaller than the reverse voltage produced across the shunting diode 10 by the leakage current of the rectifier diodes 12 and 13.

Thirdly, at the moment of switching on, the bases of the transistors 1 and 2 are biased in the forward direction via the rectifier diodes 13 and 12, the smoothing resistor 16 and the load by the supply source 5, so that the oscillator comprising the transistors 1 and 2 starts oscillating without any difficulty or delay. Therefore, it is desirable for the threshold voltage of the shunting diode 10 slightly to exceed the threshold voltage of the base-emitter paths of the transistors 1 and 2. This may be readily ensured by using a point-contact diode as the shunting diode 10.

As has been mentioned hereinbefore, when the load is switched off the base current of each transistor is substantially zero. The maximum collector current of each transistor is then also very small so that very little energy is stored in the transformer 3. Hence, during the non-conductive half cycle of each transistor, almost no energy need be fed back to the supply source 5 via the transistor. In the known push-pull converters, this feedback current flows to the positively biased collector of the corresponding transistor 1 or 2 via one half of the winding 4 and back to its emitter via the collector-base path of this transistor. In the circuit arrangement shown in FIG. 1, however, the path to the emitter of the transistor 1 or 2 is blocked by the diode 10 under no-load conditions. Thus a considerable increase of the output voltage and of the alternating voltage across the various windings of the transformer 3 with decrease in the load is prevented: the load characteristic curve is generally more level and particularly shows no considerable increase of the output voltage at very small loads. In theory the frequency of the produced oscillations should increase in inverse proportion to the peak value of the collector current of each transistor. Under no-load conditions, this frequency is however limited by the $\alpha'$ cut-off frequency of the transistors, which is about 8 kc./s. for type OC72.

In a practical embodiment of a direct-voltage converter of the kind shown in FIG. 1, the transistors 1 and 2 were of the type OC72. The rectifier diodes 12 and 13 and the shunting diode 10 all were of the type OA81. The capacitor 7 was an electrolytic capacitor of 12.5 volts and 100 μf., the capacitors 14 and 15 were electrolytic capacitors of 70 volts and 10 μf. and the capacitor 17 was an electrolytic capacitor of 150 volts and 8 μf. The variable resistor 9 had a maximum value of 2000Ω and the resistor 16 a value of 220Ω. The transformer 3 was wound in a ferroxcube pot core. The winding 4 comprised 156 turns, the winding 8 comprised 94 turns and the winding 11 comprised 750 turns. The oscillator frequency was about 2000 c./s. at full load and increased considerably with decreasing load, the highest value of this frequency being about 10 kc./s. Owing to the provision of the antiparasitic choke 6 and of the capacitor 7, the freedom from interference was very saisfactory. The entire oscillator with the exception of the input and output terminals and of the supply source 5 was built in a pressed aluminum can having a cover.

FIG. 2 shows the load characteristic curves of this embodiment. With normal loading this voltage converter supplied a current $I_o$ of 9 ma. at an output voltage $V_o$ of 90 volts. The direct current consumed was 250 ma. at a supplied direct voltage of 6 volts, so that the entire power loss wv. was only 0.42 w. When the load was switched off, the consumed direct current dropped to 0.8 ma. and the oscillator ceased oscillating. The transistors were each provided with a cooling fin. The maximum permissible collector current of 250 ma. was hardly reached under the most unfavourable load conditions, the power consumed in each transistor being 0.1 w. so that the permissible ambient temperature was 45° C. From the load curve it can also be seen that the internal resistance of the converter at a load current of at most 9 ma. was about 2500Ω.

The second embodiment shown in FIG. 3 contains a transistor 1 fed back via a transformer 3 having windings 4, 8 and 11. This converter is of the type described in U.S. Patent 2,881,380, in which the substantially unsmoothed current supplied to a load connected to the output terminals of the converter via a rectifier 12 is also fed back to the base of the transistor and thus renders the emitter-base layer of this transistor 1 conductive. In this circuit arrangement the feedback alternating voltage is determined by a tapping point on the winding 8, 11 of the transformer 3. This tapping point is connected to the positive terminal of the supply source 5 via a capacitor 18, so that of the voltage produced across the winding 8, 11 only the part set up across the part 8 of the winding is applied to the base circuit of the transistor 1. A capacitor 14 is connected in parallel with the part 11 of the winding. The capacitor 18 must have a small impedance with respect to the blocking voltage pulses produced across the part of winding 8 and the capacitor 14 must reduce the peak voltage across the diode 12 during the blocking period of the transistor 1.

Similarly to the embodiment shown in FIG. 1, in this embodiment also the base-emitter circuit of the transistor 1 is shunted by a diode 10. This diode is connected in parallel with the capacitor 18, in the pass direction with respect to the load current and in the blocking direction with respect to the base current of the transistor 1. Hence this base current cannot exceed the load current while the load current can flow through the diode 10 and exceed the base current of the transistor 1. If desired, in this arrangement also a series-resistor 9 can be inserted in the base circuit. The advantages resulting from the provision in accordance with the invention with respect to the converter according to U.S. Patent 2,881,380 are the same as those set out with respect to the embodiment of FIG. 1.

The third embodiment shown in FIG. 4 again contains a transistor 1 fed back via a transformer 3 having windings 4 and 8. However, the transistor oscillator shown is a blocking oscillator of a type described in U.S. Patent 2,965,806. The voltage pulses produced have the shape of very short flyback pulses during which the energy stored in the transformer 3 is supplied to a smoothing capacitor 17 via a rectifier 12. Similarly to the embodiment of FIG. 6 of the prior specification, the load circuit of the converter is completed with respect to direct current via the base-emitter path of the transistor 1, so that the mean base current of this transistor must be equal to the load current in the absence of a diode 10 or of a resistor substituted for this diode in the said figure of the prior specification. In the said prior specification, it is also explained that this resistor replacing the diode 10 can be omitted under certain circumstances, that is to say, with a certain ratio, which depends upon the current amplification of the transistor 1, between the voltage $V_o$ across the load and the voltage of the supply source 5. Similarly to the embodiments shown in FIGS. 1 and 3 in the embodiment of FIG. 4 of the present application the base-emitter circuit of the transistor 1 is shunted by the diode 10 connected in parallel with a capacitor 18. Thus, it is ensured in this case also that the base current of the transistor can at most be equal to the load current and that this load current can exceed the mean base current of the transistor 1. The capacitor 18 should have a small impedance for the steep and short blocking pulses produced across the winding 8, so that a complete and abrupt blocking of the transistor is effected at the end of each magnetisation cycle of the transformer 3 with increasing collector current. In this embodiment also, a series-resistor 9 included in the base-emitter circuit of the transistor 1 can be of advantage. By means of this resistor, the peak value of the forward base current of the transistor 1 and hence the peak value of its collector current are adjustable.

As has been described with reference to the three above embodiments, the measure in accordance with the invention can be applied to a large variety of transistor direct-current converter circuits. In each case it provides a protection of the circuit components against any voltage overloads which might otherwise occur under no-load conditions and it materially reduces the supply power consumed in no-load operation.

It is therefore to be understood that within the scope of the appended claims many modifications and variations of the present invention are possible in the light of the above teachings. It is further to be understood that any quantitative values given above are for illustrative purposes only and to enable ready practice of the invention.

What is claimed is:

1. A direct-voltage converter comprising a direct-voltage supply source, a transistor having an output electrode system comprising a collector electrode and an input electrode system comprising base and emitter electrodes, a feed-back transformer having a primary winding connected to said output electrode system, in series with said direct-voltage supply source, and having a feed-back winding connected to said input electrode system, a first rectifier for rectifying the output signal from said transistor and producing an increased direct voltage at a pair of output terminals, the emitter-base circuit of said transistor being connected in the forward direction in the direct-current output circuit of the converter, said emitter-base circuit being connected in parallel with a second rectifier which is also connected in the forward direction in said direct-current output circuit and in the reverse direction for the transistor base current, said second rectifier providing a path for any part of the direct current through said output circuit in excess of the base current, whereby the mean base current of the transistor cannot exceed the direct output current.

2. A direct-voltage converter comprising a direct-voltage supply source, a pair of transistors each having an output electrode system comprising a collector electrode and an input electrode system comprising base and emitter electrodes, a feed-back transformer system having a primary winding connected to said output electrode systems, in series with said direct-voltage supply source, and having a feed-back winding connected to said input electrode systems, said transistors being connected in push-pull arrangement, a first rectifier for rectifying the output signal from said transistors and producing an increased direct voltage at a pair of output terminals, the emitter-base circuit of each transistor being connected in the forward direction in the direct-current output circuit of the converter, the emitter-base circuit of each transistor being connected in parallel with a second rectifier which is also connected in the forward direction in said direct-current output circuit and in the reverse direction for the base currents of the transistors, said second rectifier providing a path for any part of the direct current through said output circuit in excess of the base currents, whereby the mean base current of each transistor cannot exceed the direct output current.

3. A converter as claimed in claim 1, further comprising a resistor connected in series in said emitter-base circuit thereby limiting the amplitude of the base forward current.

4. A converter as claimed in claim 2, further comprising a resistor connected in series in said emitter-base circuit thereby limiting the amplitude of the base forward current.

5. A converter as claimed in claim 1, wherein the direct voltage supply source is included in said direct-current output circuit, the base electrode of the transistor being biased in the forward direction through the load.

6. A converter as claimed in claim 2, wherein the direct voltage supply source is included in said direct-current output circuit, the base electrode of each transistor being biased in the forward direction through the load.

7. A converter as claimed in claim 1, further comprising a filtering capacitor connected across said output terminals, the output voltage set up across said capacitor producing a leakage current flowing through said first and second rectifiers, the voltage drop across the second rectifier biasing the base of the transistor in the blocking direction.

8. A converter as claimed in claim 2, further comprising a filtering capacitor connected across said output terminals, the output voltage set up across said capacitor producing a leakage current flowing through said first and second rectifiers, the voltage drop across said second rectifier biasing the base of the transistor in the blocking direction.

References Cited in the file of this patent

UNITED STATES PATENTS

| | | |
|---|---|---|
| 2,843,815 | Driver | July 15, 1958 |
| 2,846,581 | Volkers | Aug. 5, 1958 |
| 2,854,615 | Light | Sept. 30, 1958 |
| 2,890,403 | Van Abbe | June 9, 1959 |
| 2,920,258 | Van Abbe et al. | Jan. 5, 1960 |